United States Patent
Schmandt et al.

(10) Patent No.: US 7,443,283 B2
(45) Date of Patent: Oct. 28, 2008

(54) METHODS AND APPARATUS FOR CONNECTING AN INTIMATE GROUP BY EXCHANGING AWARENESS CUES AND TEXT, VOICE INSTANT MESSAGES, AND TWO-WAY VOICE COMMUNICATIONS

(75) Inventors: Christopher Schmandt, Winchester, MA (US); Natalia Marmasse, Ichud (IL)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/916,577

(22) Filed: Aug. 11, 2004

(65) Prior Publication Data

US 2005/0184875 A1  Aug. 25, 2005

Related U.S. Application Data

(63) Continuation-in-part of application No. 10/825,012, filed on Apr. 15, 2004, now Pat. No. 7,098,776.

(60) Provisional application No. 60/546,044, filed on Feb. 19, 2004.

(51) Int. Cl.
  *G08B 23/00*  (2006.01)
  *G08B 1/08*  (2006.01)
  *H04Q 7/00*  (2006.01)
  *H04M 3/42*  (2006.01)

(52) U.S. Cl. .............. 340/407.1; 379/209.01; 340/539.11; 340/502

(58) Field of Classification Search ..............
  340/539.13–539.15, 502, 505, 516, 524,
  340/525, 534, 539.11, 539.1; 455/404.2,
  455/412.1–413, 229; 379/201.01–201.12,
  379/210.01, 214.01, 218.02
  See application file for complete search history.

(56) References Cited

U.S. PATENT DOCUMENTS

| | | | | |
|---|---|---|---|---|
| 5,086,394 | A * | 2/1992 | Shapira | 705/1 |
| 5,587,823 | A * | 12/1996 | Yoshino et al. | 398/107 |
| 6,026,156 | A * | 2/2000 | Epler et al. | 379/215.01 |
| 6,028,514 | A * | 2/2000 | Lemelson et al. | 340/539.13 |
| 6,127,931 | A * | 10/2000 | Mohr | 340/573.4 |
| 6,127,945 | A * | 10/2000 | Mura-Smith | 340/988 |
| 6,160,478 | A * | 12/2000 | Jacobsen et al. | 340/539.12 |
| 6,181,253 | B1 * | 1/2001 | Eschenbach et al. | 340/825.37 |
| 6,529,131 | B2 * | 3/2003 | Wentworth | 340/573.1 |
| 6,671,508 | B1 * | 12/2003 | Mitsuoka et al. | 455/412.1 |
| 6,731,214 | B2 * | 5/2004 | Kuo | 340/573.1 |
| 6,759,972 | B2 * | 7/2004 | Gupta et al. | 340/994 |
| 6,947,536 | B2 * | 9/2005 | Sinclair | 379/201.01 |
| 7,133,503 | B2 * | 11/2006 | Revisky et al. | 379/88.12 |
| 2004/0100377 | A1 * | 5/2004 | Brackett et al. | 340/539.13 |
| 2004/0131160 | A1 * | 7/2004 | Mardirossian | 379/38 |
| 2005/0068167 | A1 * | 3/2005 | Boyer et al. | 340/531 |
| 2005/0084082 | A1 * | 4/2005 | Horvitz et al. | 379/114.06 |
| 2005/0153729 | A1 * | 7/2005 | Logan et al. | 455/550.1 |

\* cited by examiner

*Primary Examiner*—Benjamin C. Lee
*Assistant Examiner*—Jennifer Mehmood
(74) *Attorney, Agent, or Firm*—Charles G. Call (57) ABSTRACT

A personal communicator with context awareness in a wristwatch form for connecting intimate friends and family via awareness cues and text, voice instant message, or synchronous voice connectivity. Sensors worn with the watch produce raw data tracking location (via GPS), acceleration, and speech activity. The raw data is classified and conveyed to the other party, where it appears in iconic form on the watch face. When a remote person with whom this information is shared examines it, their face appears on the watch of the person being checked on.

50 Claims, 6 Drawing Sheets

METHODS AND APPARATUS FOR CONNECTING AN INTIMATE GROUP BY EXCHANGING AWARENESS CUES AND TEXT, VOICE INSTANT MESSAGES, AND TWO-WAY VOICE COMMUNICATIONS

CROSS REFERENCE TO RELATED APPLICATIONS

This application is a Non-Provisional of U.S. Provisional Patent Application Ser. No. 60/546,044 entitled "Methods and apparatus for augmenting telecommunication with non-verbal cues" filed on Feb. 19, 2004 by Christopher Schmandt and Natalia Marmasse. This application is also a continuation in part of U.S. patent application Ser. No. 10/825,012 entitled "Methods and apparatus for vibrotactile communication" filed on Apr. 15, 2004 by Angela Chang, Hiroshi Ishii, James E. Gouldstone and Christopher Schmandt, now U.S. Pat. No. 7,098,776 issued Aug. 29, 2006. The disclosures of each of the foregoing applications are incorporated herein by reference.

FIELD OF THE INVENTION

This invention relates to communications systems and more particularly, although in its broader aspects not exclusively, to methods and apparatus for providing communications and awareness between small sets of consenting participants.

BACKGROUND OF THE INVENTION

A good deal of research has addressed how the awareness of presence, availability and location can improve coordination and communication. Much of this work has focused on how to improve collaboration between work teams. Several systems require cameras and microphones set up in the workspace, as well as broadband connections, to support transmission of video and/or audio. Other systems require either infrared or radio frequency sensors, or heavy data processing. Recently there has been a focus on more lightweight systems for mobile devices—lightweight installation as well as easy to use. A subset of these systems is summarized below:

Awareness Through Video and Audio

The Montage system {Tang, J. and Rua, M. (1994) Montage: Providing Teleproximity for Distributed Groups, Proceedings of CHI '94 Conference on Human Factors in Computing Systems, pp. 37-43} provided lightweight audio and video "glances" to support a sense of cohesion and proximity between distributed collaborators. It used a hallway metaphor where one can simply glance into someone's office to see if it is a good time to interact. A similar metaphor was used in Cruiser {Root, R. (1988) Design of a Multi-Media Vehicle for Social Browsing. Proceedings of the CSCW '88 Conference on Computer Supported Cooperative Work, pp. 25-38; Fish, R., Kraut, R., Root, R., and Rice, R. (1992), Evaluating Video as a Technology for Informal Communication, Proceedings of the CHI '92 Conference on Human Factors in Computing Systems, pp. 37-48} which enabled a user to take a cruise around each office. The purpose of the system was to generate unplanned social interactions. In Portholes {Dourish, P. and Bly, S. (1992) Portholes: Supporting Awareness in a Distributed Work Group. Proceedings of the CHI '92 Conference on Human Factors in Computing Systems, pp. 541-547}, non co-located workers were periodically presented with updated digitized images of the activities occurring in public areas and offices. Some systems have focused on awareness solely through audio. Thunderwire {Ackerman, M., Hindus, D., Mainwaring, S., and Starr, B. (1997) Hanging on the 'Wire: A Field Study of an Audio-Only Media Space. Transactions on Computer-Human Interaction (TOCHI), vol. 4, no.1, pp. 39-66} was an audio-only shared space for a distributed group. It was essentially a continuously open conference call in which anything said by anyone could be heard by all. ListenIN {Vallejo G. (2003) ListenIN: Ambient Auditory Awareness at Remote Places, M.S. Thesis, Program in Media Arts and Sciences, MIT Media Lab} uses audio to provide awareness of domestic environments to a remote user. In order to add a layer of privacy, the audio is classified and a representative audio icon is presented instead of the raw data; if the audio is classified as speech it is garbled to reduce intelligibility.

Location Awareness

Groupware calendars have been useful tools to locate and track colleagues. Ambush {Mynatt, E. and Tullio, J. (2001) Inferring calendar event attendance. Proceedings of the IUI 2001 Conference on Intelligent User Interfaces, pp. 121-128} looked at calendar data to infer location and availability. It used a Bayesian model to predict the likelihood that a user would actually attend an event entered in his calendar. Calendars and Bayesian models have also been used to predict a user's state of attention {Horvitz, E., Jacobs, A. and Hovel, D. (1999) Attention-sensitive alerting. Proceedings of UAI '99 Conference on Uncertainty in Artificial Intelligence, pp. 305-313}, Location-aware systems have used infrared or radio frequency sensors to keep track of electronic badges worn by people {Want R., Hopper A., Falcao V., and Gibbons J. (1992) The Active Badge Location System. ACM Transactions on Information Systems, vol. 10, pp. 99-102} or the Global Positioning System (GPS) {Marmasse, N., and Schmandt, C. (2000) Location-aware information delivery with comMotion, Proceedings of HUC2000 International Symposium on Handheld and Ubiquitous Computing, pp. 157-171}. The Work Rhythms project {Begole, J., Tang, J., Smith, R., and Yankelovich, N. (2002) Work Rhythms: Analyzing Visualizations of Awareness Histories of Distributed Groups, Proceedings of the CSCW 2002 Conference on Computer Supported Cooperative Work, pp. 334-343} looks at location of computer activity to create a user's temporal patterns. Awareness of these patterns helps co-workers plan work activities and communication. When a user is "away", the system can predict when he will be back.

Context and Mobile Telephony

The so-called context-awareness of computer systems falls very short of what humans can assess. As Erickson {Erickson, T. (2002) Ask not for Whom the Cell Phone Tolls: Some Problems with the Notion of Context-Aware Computing. Communications of the ACM, Vol. 45, No. 2, pp. 102-104} puts it: the ability to recognize the context and determine the appropriate action requires considerable intelligence. Several systems keep the human "in the loop" by enabling the potential recipient to select a profile appropriate for the context. In the Live Addressbook {Milewski, A. and Smith T. (2000) Providing Presence Cues to Telephone Users. Proceedings of the CSCW 2000 Conference on Computer Supported Cooperative Work, pp. 89-96} users manually updated their availability status and the location where they could be reached. This information was displayed to anyone trying to contact them. Although the updates were manual, the system prompted the user when he appeared to be somewhere other than the location stated. Quiet Calls {Nelson, L., Bly, S., and Sokoler, T. (2001) Quiet Calls: Talking Silently on Mobile Phones, Proceedings of SIGCHI conference on Human Factors in Computing Systems, pp. 174-181 } enabled users to send callers pre-recorded audio snippets, hence attending a call quietly. The user could listen to what the caller was saying and send a sequence of standard answers. Another system that shares the burden of the decision between caller and callee is Context-Call {Schmidt, A., Takaluoma, A., and Mäntyjärvi, J. (2000) Context-Aware Telephony Over WAP. Personal and Ubiquitous Computing, vol. 4, no. 4, pp. 225-229}. As with most profile options, the user must remember to update the stated context.

Lightweight Text Communications

ICQ started as a lightweight text message web application in 1996. It has since grown into a multimedia communication tool with over 180 million usernames, and 30 million users accessing per month {AIM, October 2002. http://news.com.com/2100-1023-963699.html}. A user's availability is automatically set based on computer activity; however it can manually be overridden. Babble {Erickson, T., Smith, D. N., Kellogg, W. A., Laff, M., Richards, J. T. and Bradner, E. (1999) Socially Translucent Systems: Social Proxies, Persistent Conversation and the Design of "Babble". Proceedings of the CHI '99 Conference on Human Factors in Computing Systems, pp. 72-79} aimed to support communication and collaboration among large groups of people. It presented a graphical representation of user's availability, based on their computer interaction. Nardi et. al. {Nardi, B., Whittaker, S, and Bradner, E. (2000) Interaction and Outeraction: Instant Messaging in Action. Proceedings of the CSCW 2000 Conference on Computer Supported Cooperative Work, pp. 79-88} studied the extensive use and affordances of instant messaging in the workplace. Desktop tools for managing communication, coordination and awareness become irrelevant when a user is not near their computer. Awarenex {Tang, J., Yankelovich, N., Begole, J., VanKleek, M., Li, F., and Bhalodia, J. (2001) ConNexus to Awarenex: Extending awareness to mobile users. Proceedings of the CHI '01 Conference on Human Factors in Computing Systems, pp. 221-228} extends instant messaging and awareness information to handheld devices. It has the concept of a "peek", an icon that appears in the buddy list indicating a communication request. Hubbub {Isaacs, E., Walendowski, A., Ranganthan, D. (2002) Hubbub: A sound-enhanced mobile instant messenger that supports awareness and opportunistic interactions. Proceedings of the CHI '02 Conference on Human Factors in Computing Systems, pp. 179-186} is a mobile instant messenger that supports different sound IDs; the location data is updated manually.

Non-verbal Communication Systems

There are also some systems that have looked at ways to enhance interpersonal communication by adding physical feedback via actuators. ComTouch {described in the above-noted U.S. patent application Ser. No. 10/825,012 entitled "Methods and apparatus for vibrotactile communication" filed on Apr. 14, 2004 by Angela Chang, Hiroshi Ishii, James E. Gouldstone and Christopher Schmandt, now U.S. Pat. No. 7,098,776 issued Aug. 29, 2006; and in the paper: Chang, A., O'Modhrain, S., Jacob, R, Gunther, E. and Ishii, H. (2002) ComTouch: Design of a Vibrotactile Communication Device. DIS '02 Symposium on Designing Interactive Systems, pp. 312-320} augments remote voice communication with touch. It translates in real-time the hand pressure of one user into vibrational intensity on the device of the remote user. The Kiss Communicator {Buchenau, M. and, Fulton, J. (2000) Experience Prototyping. DIS '00 Symposium on Designing Interactive Systems, pp. 424-433} enabled couples to send each other kisses. One person would blow a kiss into one side of the device and the remote piece would start to blink. The other person could respond by squeezing the communicator causing the lights to blink on the side of the original sender. The Heart2Heart {Grimmer, N., (2001) Heart2Heart. Winner of Intel Student Design Competition 2001. http://www.baychi.org/calendar/20010508/#1} wearable vests conveyed wireless "hugs" by simulating the pressure, warmth and sender's heart-beat as would be felt in a real embrace. Paulos {Paulos E. (2003) Connexus: A Communal Interface.} suggests a system with sensors (accelerometer, force sensing resistors, temperature, microphone for ambient audio) and actuators (Peltiers, bright LEDs, vibrator, "muscle wire", speaker for low level ambient audio) to enhance non-verbal telepresence. This system will use Intel's Motes and will include a watch interface.

Watches

Whisper {Fukumoto, M., Tonomura, Y. (1999) Whisper: A Wristwatch Style Wearable Handset. Proceedings of the CHI '99 Conference on Human Factors in Computing Systems, pp. 112-19} is a prototype wrist-worn handset used by sticking the index fingertip into the ear canal. The receiver signal is conveyed from the wrist-mounted actuator (electric to vibration converter) to the ear canal via the hand and finger by bone conduction. The user's voice is captured by a microphone mounted on the inside of the wrist. Commercial handsets built into wristwatches are also starting to appear, such as NTT DoCoMo's wrist phone or RightSpot {Krumm, J., Cermak, G., and Horvitz, E. (2003) RightSPOT: A Novel Sense of Location for a Smart Personal Object. Proceedings of Ubicomp 2003: Ubiquitous Computing, pp. 36-43}

SUMMARY OF THE INVENTION

The preferred embodiment of the present invention, a watch-based personal communicator called "WatchMe," draws upon features of both mobile telephony and context-aware ubiquitous computing and integrates them in a novel user interface. WatchMe extracts information from sensors to provide awareness and availability information to one's closest friends. It supports multiple modes of verbal communication (text messaging, voice messaging, and synchronous voice communication) enabling the recipients of the awareness information to choose the best communication modality. Photographs serve as emotional references to our loved ones, appearing on the watch display when one of them demonstrates he or she is thinking of us by using their WatchMe device to view information about us.

BRIEF DESCRIPTION OF THE DRAWINGS

In the detailed description which follows, frequent reference will be made to the attached drawings, in which.

DETAILED DESCRIPTION

1 Motivation

Everyone has a small group of individuals with whom they are emotionally close, a set of individuals who are very important in their lives. These are typically family members and/or intimate friends; individuals from our "inner circle" that we call "insiders." Nothing can replace the richness of face-to-face communication with these individuals; however, with our ever mobile and hectic lives, that is not always possible.

It is an object of the present invention to use mobile communication ubiquitous computing to enable these individuals to keep in contact with each other. We would like to increase and facilitate communication, in a variety of modalities, among these small sets of intimate individuals. It is our hypothesis that would want communication with this very select group of dear individuals everywhere and all-the-time, as long as it were not too intrusive and they felt in control. The specific embodiment of the invention described below provides different layers of information that afford different degrees of communication as follows:

Awareness

Awareness is based on sending some basic information about ones activities. This information must require very low bandwidth since the system is always on, and hence constantly sending a trickle of data. For awareness data to be meaningful at a glance, it must be abstracted; it requires more effort to interpret raw sensor data, so we don't display it. The person receiving our context data is not a stranger, but rather someone who knows us well and therefore can help interpret properly abstracted sensor data. The awareness data must be both collected and abstracted automatically; since people are unlikely to update it manually. This awareness data is the background information layer. A person is going about his way, sending out this awareness data to his intimates, having no idea if anyone is paying attention to it.

"Thinking of You"

This is the second layer of information, and the next layer up in terms of (tele)communication intimacy. The information being sent from one side causes changes to the display on the other side, i.e. person B is made aware that person A is thinking of him. At this stage there has not yet been any formal communication or exchange of verbal messages. This information transfer must require low bandwidth and have a low level of intrusiveness.

Message Exchange

After checking availability, or in response to "thinking of you", one party sends a message. There are three levels of messages;

1. asynchronous text (e.g. text instant messaging),
2. asynchronous voice (e.g. voice instant messaging), and
3. synchronous voice (e.g. full-duplex phone call).

These different modes of messages are increasingly intrusive. The system should enable a person to make an informed decision regarding the mutually preferable mode of communication. Escalation of the mode can occur during the flow of the communication. For example, if a person sees that another is thinking about them, they might respond by sending a message saying "want to talk?", or alternatively "I'm really busy!".

Such a system has four basic requirements. First, it should be always with you and always on. Second, the awareness data must be automatically gathered. Third, the system must be able to alert the user in subtle ways since the user needs to be aware of the awareness information if he or she is paying attention to some other task. Finally, the system must be able to support communication modalities with multiple degrees of intimacy; that is, use different media.

The specific embodiment of the invention described below, called "WatchMe," is a mobile communication and awareness platform embodied in a watch. The system hardware, functionality and user interface, including evolution of the design is described below.

1.1 Why a Watch?

A watch is an artifact very assimilated into our lives. It is something most people wear, something we glance at numerous times a day. It is always accessible, always on, and in the periphery of our attention. Watches are very noticeable, but in a non-intrusive manner.

The device should include mobile phone capabilities since one can hardly imagine a system for intimate telecommunication that doesn't include duplex synchronous voice transmission capabilities. From a telephone network point of view text messaging, asynchronous voice and synchronous voice may be handled in very different ways. However from the user's point of view, they are all just different ways of reaching the same person, with different levels of intimacy.

Building such a system into a watch is a challenge, due to its physical size. A key requirement of the user interface is that it must convey a lot of information in a relatively small amount of space, and in an aesthetically pleasing manner. An additional requirement was a device that could comfortably support switching between modalities. A watch is in a location that is easily manipulated—albeit with one hand.

It should be understood that the specific implementation of the invention in the form of a watch is merely one illustrative application of the invention. The methods and apparatus described might, for example, take the form of an extend functionality in a cellular or portable telephone, a communicating PDA, a mobile communications system in a vehicle, or some other form of body-worn communication device.

2 Hardware

Figure 1:
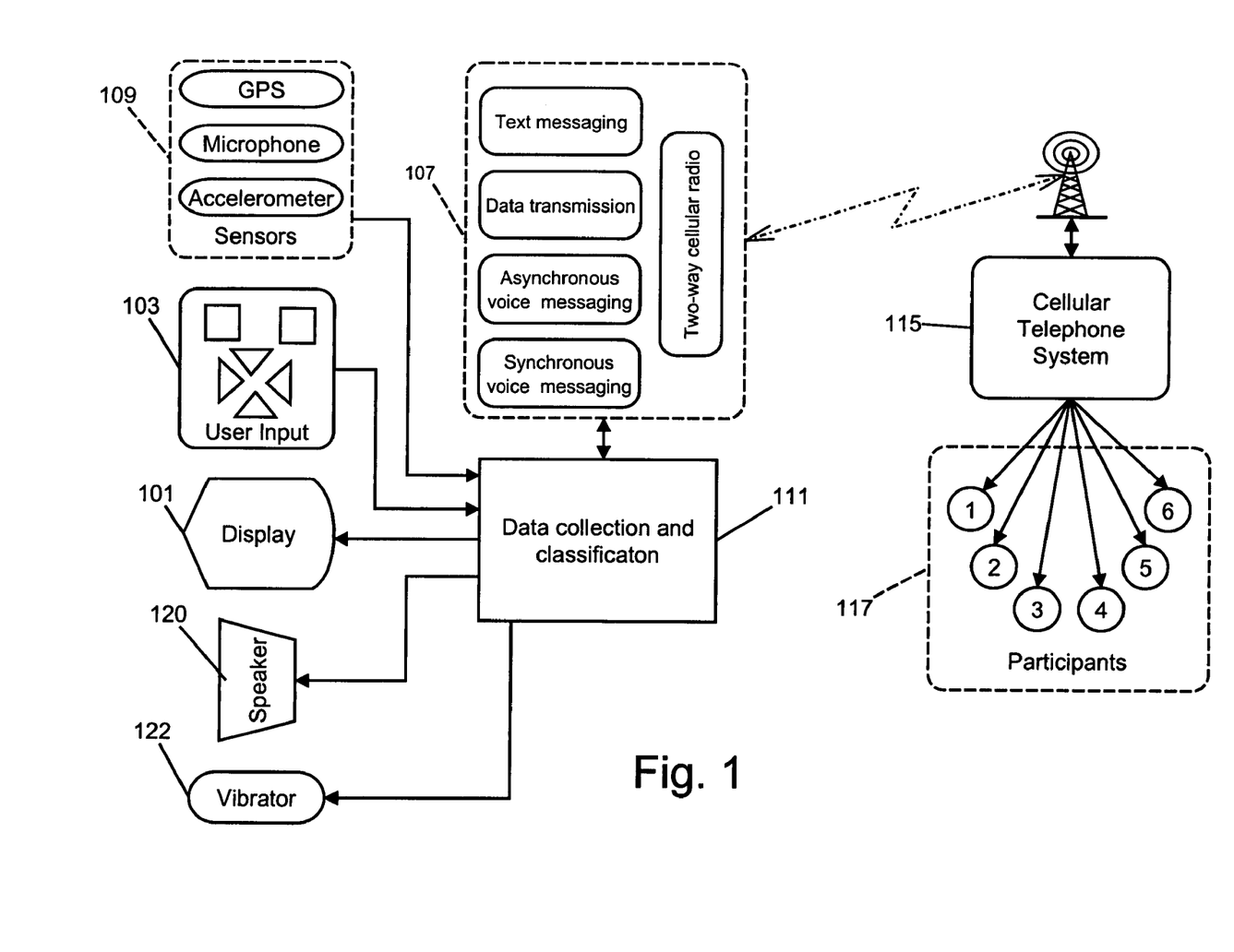
FIG. 1 is a block diagram of a communications system embodying the invention.

The hardware comprises three components shown in FIG. 1: the display 101 and user input device 103, the communication radio unit 107, a sensing unit 109 and a processor 111 for performing data classification and control. The radio unit provides two way data and voice communication via a cellular telephone system indicated generally at 115 which links the radio unit 107 to like WatchMe devices worn by each individual in a small group of "insiders" illustrated at 117.

Our initial design rationale required that the user interface be easily accessible and frequently visible, which lead to a watch-based design. Since appropriately sized hardware was not available, a prototype was constructed with separate components. This is actually consistent with an alternative hardware architecture with several components, in different locations on or near the body, that communicate via a low power Personal Area Network, such as Bluetooth. For example, a display 101 and user input device 102 may be placed in the watch case along with a Bluetooth transceiver that communicates with a nearby communication radio unit 107 that provides a cellular telephone link. A suitable Bluetooth compliant transceiver may be implemented with existing integrated circuit products, such as the Motorola MC71000 Bluetooth Baseband Controller, the Motorola MC 13180 Bluetooth RF Transciever Integrated Circuit, the Motorola MRFIC2408 External Power Amplifier IC, and the Motorola MC13181 power management chip. Bluetooth transceivers are commonly included in cellular telephones to support the use of body worn earphones and microphones.

In the prototype, the radio unit 107 was implemented by a Motorola's iDEN i730 multi-communication device which provides a conventional, bidirectional audio voice communications channel as well as the additional TCP data communications channel. The iDEN i730 includes a built in processor which can be programmed using the Java 2 Platform, Micro Edition, also known as the J2ME™ platform, which enables developers to easily create a variety of applications, as described in the *i730 Multi-Communication Device J2ME™Developer's Guide*, Motorola Corp. (2003). This processor may be programmed to process and classify data from the sensor unit 109 as indicated at 111. As discussed below, in the prototype unit, the processor used was a body worn HP iPaq PDA. The Bluetooth transceiver used in the watch and in the radio unit both employ the Bluetooth Telephony Control protocol Specification Binary (TCS Binary) to manage both a data link and a baseband audio channel. The Telephony Control Prototype Specification which defines the call control signaling for the establishment of speech and data calls between Bluetooth devices is described in detail in Part F:3 of the Specification of the Bluetooth System, Volume 1, Version 1.1 (Feb. 22, 2001).

Display and User Input

Figure 2:
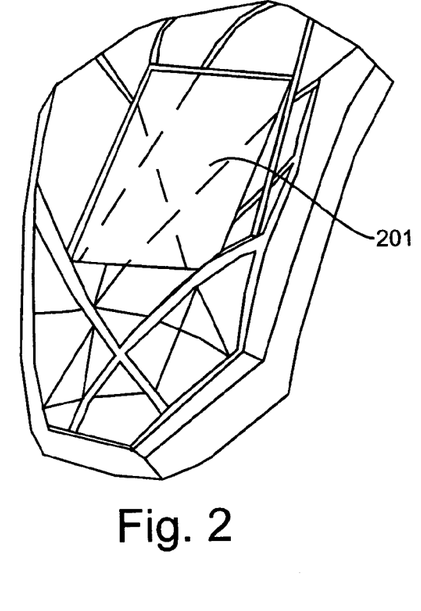
FIG. 2 is a perspective view of an illustrative watch case which houses a display and user input buttons for the communicator contemplated by the invention.

In the prototype, the display shown at 101 was removed from an Motorola iDEN mobile phone and encased in a watch case shell depicted in FIG. 2. This same shell includes the buttons for the user input 103. The combination of the display and user interface housed within the shell will be referred to as "the watch". As noted above, the radio communication unit, if sufficiently small, may also be housed within the watch, or may be an external unit connected via a short-range wireless link such as Bluetooth, via a wired connection to a separate, body worn radio unit. The watch shell also contains the sensor unit 109, a speaker 120 and a vibrator 122.

Wireless Communication

The radio component is the base portion of an iDEN phone, i.e. with the display part of the clamshell removed. It is connected to the watch component via a flat flex cable and wires. iDEN is a specialized mobile radio network technology that combines two-way radio, telephone, text messaging and data transmission in one network. It supports an end-to-end TCP/IP connection. Other networks, such as GSM/GPRS, could also be used to provide long range communications using a different radio unit. The WatchMe system supports text messaging as well as voice messaging, using TCP/IP sockets. It also supports synchronous voice communication, using the ordinary mobile phone telephony functions. In this prototype the phone can be up to 35 cms from the watch, limited by the length of the flex cable, so it could be strapped to the user's forearm. Using a Bluetooth short range wireless link, the radio unit may be carried on the body or located nearby. When a separate body worn radio unit is employed, the sensor unit as well as the speaker and vibrator may be located in either the watch case or the radio unit. For convenience, however, the display unit and the user input unit should be placed in the watch for the reasons stated in Section 1.1, above.

Sensing and Classification

In the prototype unit, the sensors 109 was connected to or embedded in, an iPaq PDA manufactured by Hewlett-Packard Company, Palo Alto, Calif. which performed the data collection, classification and control functions shown at 111. The iPaq reads the sensors 109, does data collection, and classifies the input. The current prototype includes the three sensors seen at 109: a Global Positioning Sensor (GPS) to classify locations, an accelerometer to classify user activity, and a microphone for speech detection. In the prototype, iPaq is clipped to the user's belt. The GPS unit can be embedded in the phone or connected to the PDA.

3 Functionality

The system seen in FIG. 1 can be divided into three different functional components: the watch, which comprises the user interface 103 and the display 101; the radio unit 107, through which the wireless communication is established to other participants 117 via a cellular network 115; and the sensors 109 and an classification processor 111 by which the personal context data is abstracted. The network 115 simply relays messages and context data from one user to another and may employ the preferred cellular telephone system and/or some other data and voice communication network, such as the Internet or the public switched telephone network 3.1 Watch User Interface A watch is a personal device, but it is also very public. We often look at other people's watches to know the time when it would be socially awkward to look at our own. Watches are also often a fashion statement, meant to be looked at by others. Since it is at the seam of the personal and the public, the interface has tiers of different levels of information, with different levels of privacy.

The face of the watch includes a display screen seen at 201 in FIG. 2 that is visible to all and conveys information accessible to all, i.e. time. The display screen 201 seen in FIG. 2 as well as the individual displays screens seen in FIGS. 3-5 each display lines which continue the pattern lines on the surface of the watch shell, thereby visually integrating the screen into the shell design. The incorporation of shell pattern lines on the screen provides harmony between the graphics on the screen and the physical form of the watch itself.

People glance at their watch more often than they perceive. By embedding high-level information in the watch's default mode, illustrated by the default display screen seen in FIG. 3, the user can keep track of his or her loved-ones subconsciously and continually throughout our day. In addition to the time display which is implemented by the hour and minute hands seen at 301, the top level default screen also embodies other information meaningful only the owner. The owner of the watch chooses a unique icon and position around the watch face for each insider; although this is visible to others, they do not know the mapping from icons to names. In the example seen in FIG. 3, icons for six members of the insider group are seen at 303, 305, 307, 309, 311 and 313. Research {see: Isaacs, E., Walendowski, A., Ranganthan, D. (2002) Hubbub: A sound-enhanced mobile instant messenger that supports awareness and opportunistic interactions. *Proceedings of the CHI '02 Conference on Human Factors in Computing Systems*, pp. 179-186} has shown that, with text messaging clients, users interact recurrently with 5-7 people on a general basis. To play it safe, we chose to display icons for up to eight insiders.

Figure 3:
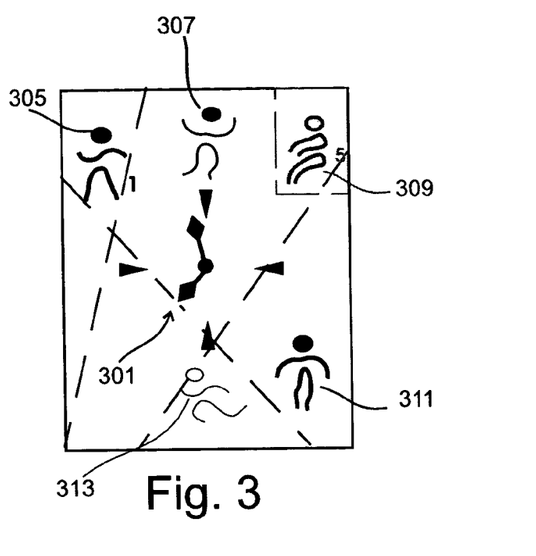
FIG. 3 shows a default display screen layout used by the communicator to identify other participants and their availability.

At this top level as seen in FIG. 3, the color of each icon indicates the availability of the individual represented by the icon, fading to toward the background color in three steps: the most faded color (illustrated for the icon 313) indicates that this insider does not have cellular coverage, the midway color (illustrated for the icon 309) indicates that the individual is in a conversation and hence probably less available. The icons 305, 307 and 311 are presented in a "full color" that contrasts with the background and indicates that these three individuals have cellular coverage and are not currently in a conversation. Speech is indicative of social engagement, and it has been found to be the most significant factor in predicting availability {Hudson, S., Fogarty, J., Atkeson, C., Forlizzi, J., Kiesler, S.. Lee, I. and Yang, J. (2003) Predicting Human Interruptibility with Sensors: A Wizard of Oz Feasibility Study, *Proceedings of CHI '03 Conference on Human Factors in Computing Systems*, pp. 257-264}, therefore it was coded into the presentation of the icons on the top level screen.

From a full-color icon it is not possible to infer more detail concerning availability without going down a level in the interface and seeing more detail about the individual represented a full color icon. This is done by selecting the corresponding icon, via the Left/Right navigational buttons of the user input 103, and then pressing the Down button, producing the second level displays illustrated in FIG. 4. The more detailed information that can be viewed here (described clockwise from the top left) is the specific individual's assigned icon seen at 401, whether that individual is engaged in a conversation illustrated by the presence of a graphical symbol at 403, how many voice and text messages this individual has left illustrated by the numerals at 405 and 407 respectively, and the individual's mode of transport (walking, vehicle, biking, etc) illustrated by a graphical symbol at 409. Also displayed is the individual's current location, or the individual's next predicted location and the expected time of arrival, or his last known location and time elapsed since departure. For example, in FIG. 3, we see that Joe left home (indicated by the symbol 411) 10 minutes ago (indicated by the numeral 10 at 413), that he is driving (indicated by the car symbol at 409), and in a conversation (indicated by the symbol 403), and that he has sent 2 voice messages (indicated by the numeral at 405) and 3 text messages (indicated by the numeral at 407.

Note that the numeral "5" nest to the individual's icon 309 in the top level display seen in FIG. 3 shows that he has left five messages total. Although it is necessary to navigate to the second level screen for the detailed information, the top level provides an overview of all insiders, displaying salient information regarding their availability, and the number of new messages they have sent. Since Joe is driving and also talking, this is probably not a good time to phone him. For an insider, this little information can go a long way. With a combination of prior knowledge and a form of telepresence provided by the watch, it is possible to quickly form a meaningful interpretation. For example, knowing Joe and judging by the time and that he is driving and talking, it is possible to presume that he has already picked up his buddy and is heading to the gym. If "gym" is a location Joe has revealed, once the system has enough information to predict he is heading there, the icons will change to reflect that (gym icon, direction arrow, and ETA).

Figure 4:
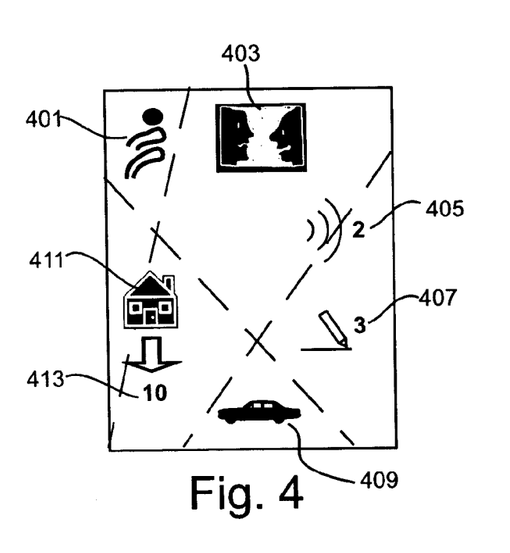
FIG. 4 shows a second level display screen which displays more detailed information concerning a selected participant.
Figure 5:
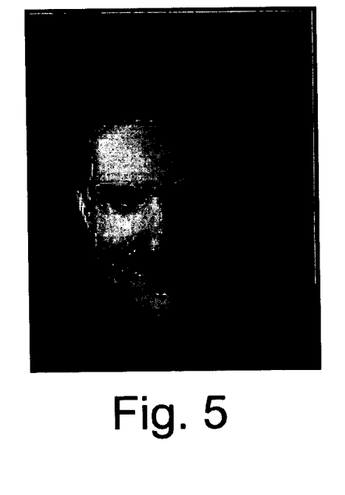
FIG. 5 is a display screen showing a photograph of a remote user displayed when that remote user is viewing detailed information about the user.

When a user selects and views the second level screen to obtain more detailed status information about another participant, that user's photograph is displayed for a predetermined time on the face of the other participant's watch as illustrated in FIG. 5. In addition, the second level screen of FIG. 4 may display a pre-selected image (e.g. a photograph as seen in FIG. 5) of the selected insider appears as a low contrast background image so that the user can easily associated each icon and second level detail screen with the person to whom those icons and screens relate.

The watch supports text messaging, voice messaging, and phone calls. The content of the text and voice messages, as well as the ability to compose messages or place a phone call to the insider, is accessed through yet a deeper layer which is first seen as a menu screen shown in FIG. 6. This menu screen displays the name of the person with whom a message exchange is desired, the number of text instant messages (IM) that have been received from that person and are available for display; the number of voice instant messages that have been received and recorded and are available for playback, and the option to send a new voice instant message, place a cellular phone call to the person, or send a "smile" (a non-verbal message) to the person.

Figure 7:
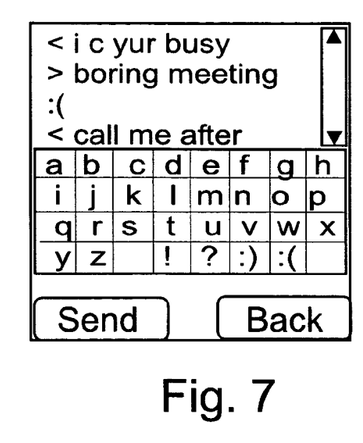

If the user selects the "Text IM" option, the previously received instant messages from others are displayed in the top panel seen in FIG. 7, and a navigatable keyboard is displayed on the bottom panel, enabling the user to use the user input keys (at 103 in FIG. 1) to compose and send one or more responses or a new instant message to the selected person.

Figure 6:
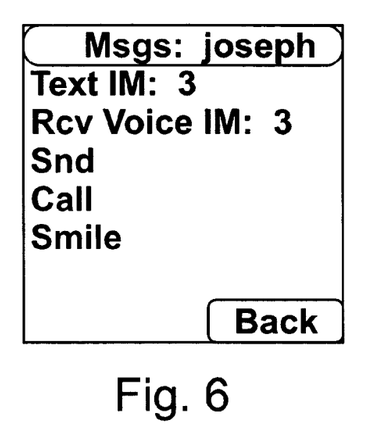
FIGS. 6-9 illustrate control screens displayed when the user is selecting and executing message exchange functions.
Figure 8:
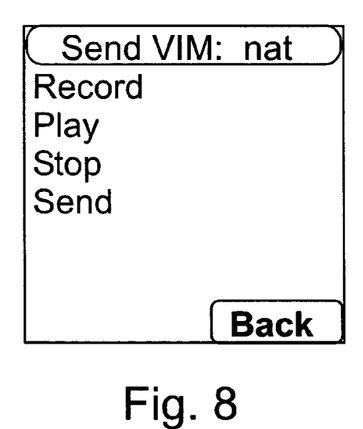

If the user selects the "RCV Voice" option on the screen seen in FIG. 6, the VIM control screen seen in FIG. 8 is displayed, providing menu selected controls that permits the user to playback and stop a received voice message, and to record and send a voice message for the identified insider.

If the user selects the "call" option on the menu screen seen in FIG. 6, the system places a cellular phone call to the selected person with the objective of establishing a two-way conversation between the user and the selected person. It is important to note that a telephone call is placed only after the caller is made aware of the availability of the selected person, and provided with information describing that person's location and activity. In this way, the called person is less likely to be interrupted when occupied with other tasks, and more likely to welcome the incoming calls that are received.

Figure 9:
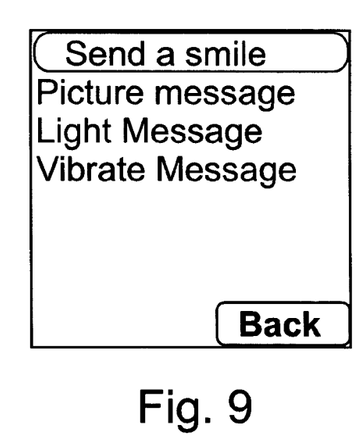

If the user selects the "Smile" option on the menu screen seen in FIG. 6, the "Send a Smile" control menu of FIG. 9 is displayed, giving the user the opportunity to "send a picture" (which causes the sender's picture to be displayed on the receiver's watch), to "send a light message" which causes the receiver's display to be illuminated in a special way (such as by flashing the icon of the sender on the screen of FIG. 3; or to "send a vibration message" which causes the receiver's watch to vibrate each time a user input button is pressed on the sender's watch.

The transmission of vibrations as "touch signals" between individuals is described in more detail in the above-noted U.S. patent application Ser. No. 10/825,012 entitled "Methods and apparatus for vibrotactile communication" filed on Apr. 14, 2004 by Angela Chang, Hiroshi Ishii, James E. Gouldstone and Christopher Schmandt and in the paper: Chang, A., O'Modhrain, S., Jacob, R., Gunther, E. and Ishii, H. (2002) ComTouch: Design of a Vibrotactile Communication Device. DIS '02 Symposium on Designing Interactive Systems, pp. 312-320.

A fundamental part of communication is its reciprocal characteristic. When an insider lingers viewing another's detailed information (for example, learning that she is biking to work and expected to arrive in 18 minutes), the image of the person viewing the detailed information appears on the reciprocal wristwatch as illustrated in FIG. 4. In this way one can have a notion of when a specific insider is thinking of the other, and this information may subsequently stimulate an urge to contact that person. This conviction is supported by practices observed in Internet instant messaging, where a significant fraction of the communication happens immediately after a party appears online.

Knowing that someone is thinking of you creates opportunity for communication, but not an obligation. When the picture appears on the "viewed" insider's watch, one of the following could occur:

(a) The picture popping up may go unnoticed, especially since it disappears after a couple of minutes, so the "viewing" insider is not interfering with the "viewed" insider in any way;

(b) The "viewed" insider notices the picture but decides not to reply or divert attention from his current action;

(c) The "viewed" insider notices the picture and responds by querying the availability of the other user, which causes his or her picture to appear on the other's watch, similar to an exchange of glances without words; or (d) The "viewed" insider decides to phone the "viewer" or engage in another form of verbal communication, i.e. text or voice messaging.

There are a number of alerting modes on the watch. For example, when your picture appears on my watch, indicating that you are thinking about me, the backlight turns on to draw a little attention. The watch can also vibrate (or emit sounds) and these could be used as well if the wearer wants the watch to be more intrusive. These same features can also be used for non-verbal communication. When a picture appears, the user can send back a photograph from a stored repository, or alternatively manipulate the other individual's watch backlight or vibration actuator enabling them to develop their own non-verbal codes.

3.2 Radio

The radio component seen at 107 in FIG. 1 is connected to the display 101 and the buttons 103 in the watch. This unit performs the processing required for the user interface, manages the socket connection to the server (which relays the messages between users), and performs the telephony functions required for the synchronous voice communication.

All mobile phones have microphones, many already have embedded GPS chips (at least in the U.S. due to the FCC E-911 wireless location mandate), and soon some will have embedded accelerometers which can also be connected via the phone's serial port. Thus, although such mobile phones would include the required sensors, it may not have sufficient computing power to perform the data classification functions indicated at 111. Accordingly, in the prototype, the classification is performed on an iPaq, and the classifier outcome is then communicated to the phone unit 107.

3.3 Sensors and Classification

Cues from the physical world often help us infer whether a person is interruptible or not. An office with a closed door, for example, may indicate that the person is not around, or does not want to be disturbed. However from prior knowledge we may be aware that this particular person is easily distracted from outside noise and therefore keeps the door shut, but that it is perfectly acceptable to simply knock. If a door is ajar and voices can be heard, then perhaps the person is unavailable—that could depend on the nature of the relationship and the urgency of the topic. Throughout our lives we have acquired a whole protocol of what is appropriate in different (co-located) social contexts. How do we do this at a distance? What is the subset of cues necessary to convey to people (who know us well) that will help them infer our availability?

Locations are classified based on latitude/longitude, founded on an extension to the software from our comMotion system {see Marmasse, N., and Schmandt, C. (2000) Location-aware information delivery with comMotion. *Proceedings of HUC2000 International Symposium on Handheld and Ubiquitous Computing*, pp. 157-171}. The original version detected frequented indoor locations, based on loss of the GPS signal. The location mechanism used in WatchMe was enhanced to also detect locations where the receiver remains stationary without the loss of signal. When the system identifies a previously unnamed frequented location, it prompts the user to label it. In this way the system learns from and adapts to the user over time, only prompting him when an unknown location is encountered. The string associated to the labeled locations is what is reported to the other phones. A basic set of strings is associated with default icons, such as "home" and "work, " and these stored icons are displayed as illustrated at 411 in FIG. 4. A location will only be sent if it is named, and if the recipient hasn't associated an icon with that name, a text string appears instead of the graphic symbol at 411. We also enhanced the earlier comMotion model which analyses patterns of mobility to determine routes, positions along those routes, and an estimated time to arrival; a preliminary version of the algorithm was described in our paper: Marmasse, N., and Schmandt, C. (2002) A User-Centered Location Model. Personal and Ubiquitous Computing, vol 6, no. 5-6, pp. 318-321. This is algorithm may be used to indicate, for example, that the user left home 10 minutes ago, or will arrive at the office in 15 minutes.

GPS data over time allows velocity to be computed with enough resolution to differentiate between walking and driving (as long as not in urban gridlock). Although it is difficult to detect the difference between highway driving and riding a train, for example, the route classifier differentiates these two travel paths and the user has the ability to label them. For higher resolution classification, such as differentiating between walking, running, and bicycling, we rely on two orthogonal 2-axis accelerometers giving 3 axes of acceleration {see Munguia Tapia, E. and Marmasse, N. (2003) Wireless Sensors for Real-time Activity Recognition, http://web.media.mit.edu/~emunguia/portfolio/html/wsensors.htm}.
The velocity classification scheme is similar to that described by Bao, L. (2003) Physical Activity Recognition from Acceleration Data under Semi-Naturalistic Conditions. M.Eng. Thesis Electrical Engineering and Computer Science, Massachusetts Institute of Technology, September '03, which analyses the mean, energy, frequency-domain entropy and correlation between two different acceleration axes. With five sensors it is possible to correctly classify 20 activities such as walking, running, brushing teeth, folding laundry, and climbing stairs; WatchMe uses fewer degrees of classification to translate accelerometer and GPS data into a limited set of symbolically represented activity types displayed as shown at 409 in FIG. 4.

The third sensor in the sensor unit seen at 109 in FIG. 1 is a microphone. In the prototype, audio data from the iPaq PDA's microphone is collected and examined in near real-time to detect whether it is speech. The analysis involves taking 10 seconds of audio, looking at the pattern of the voiced segments in the pitch track, and determining whether it corresponds to speech. This is a binary speech discriminator, it is not necessary to know whether the speech is generated by the user himself or someone he is talking to; as he is probably in a conversation in either case. Likewise, we do not try to distinguish whether the conversation is over the phone or with someone physically present, though this could easily be determined. None of the audio is stored, nor do we try to perform any speech recognition.

Others have shown the value of sensors in identifying a person's context {see Clarkson, B., Mase, K., and Pentland, A. (2000) Recognizing user context via wearable sensors. *Proceedings Fourth International Symposium on Wearable Computers*, pp. 69-76; and Hinckley K., Pierce, J., Sinclair, M., and Horvitz, E. (2000) Sensing techniques for mobile interaction. *ACM User Interface Software and Technology*, CHI Letters 2: 91-100}. The determination of speech as a significant factor in indicating interruptablility is discussed by Hudson, S., Fogarty, J., Atkeson, C., Forlizzi, J., Kiesler, S., Lee, J. and Yang, J. (2003) in Predicting Human Interruptibility with Sensors: A Wizard of Oz Feasibility Study, *Proceedings of CHI '03 Conference on Human Factors in Computing Systems*, pp. 257-264.

3.4 Functional Overview

Figure 10:
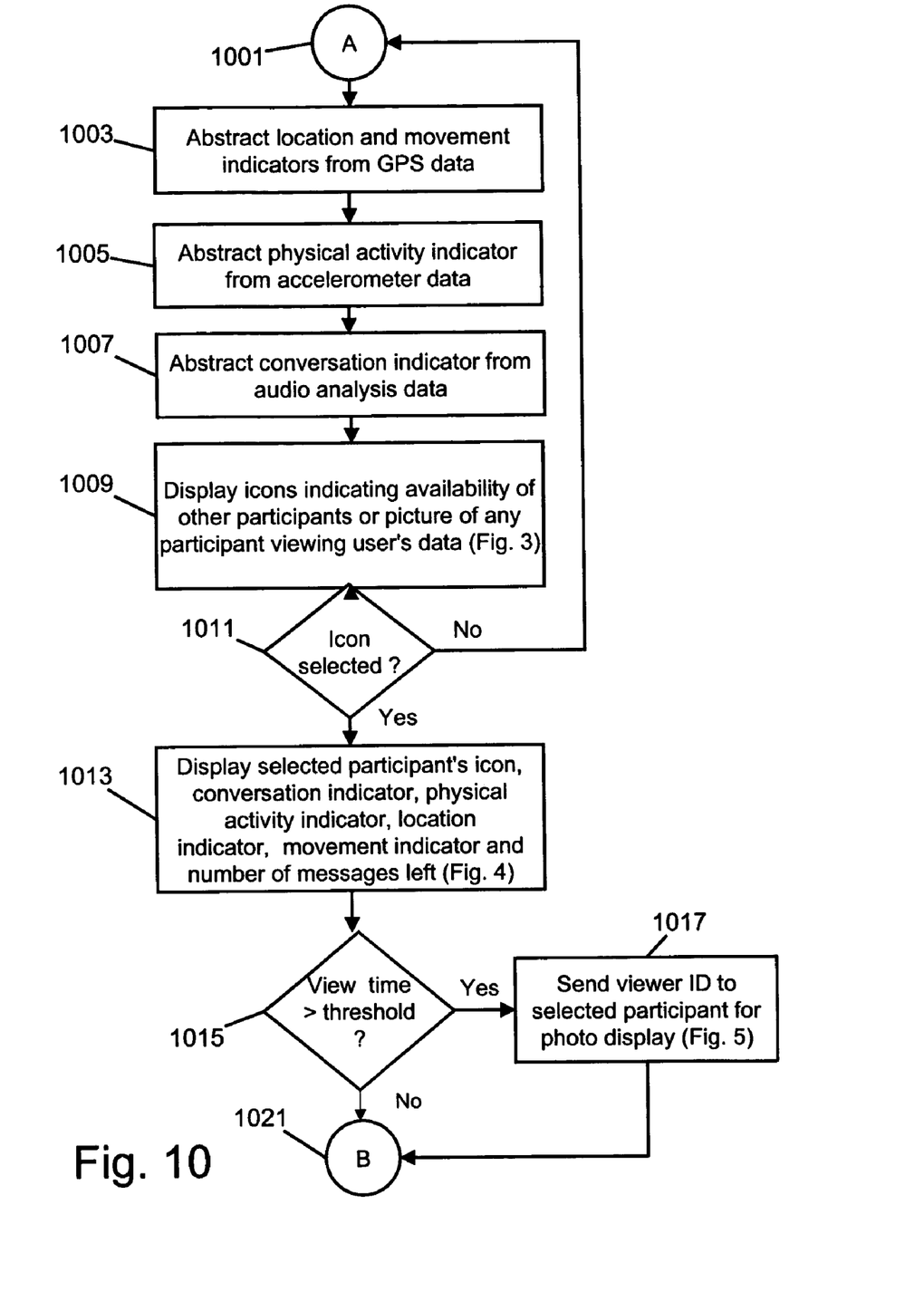
FIGS. 10-11 are flowcharts illustrating the principle function performed during the operation the communicator devices contemplated by the invention.
Figure 11:
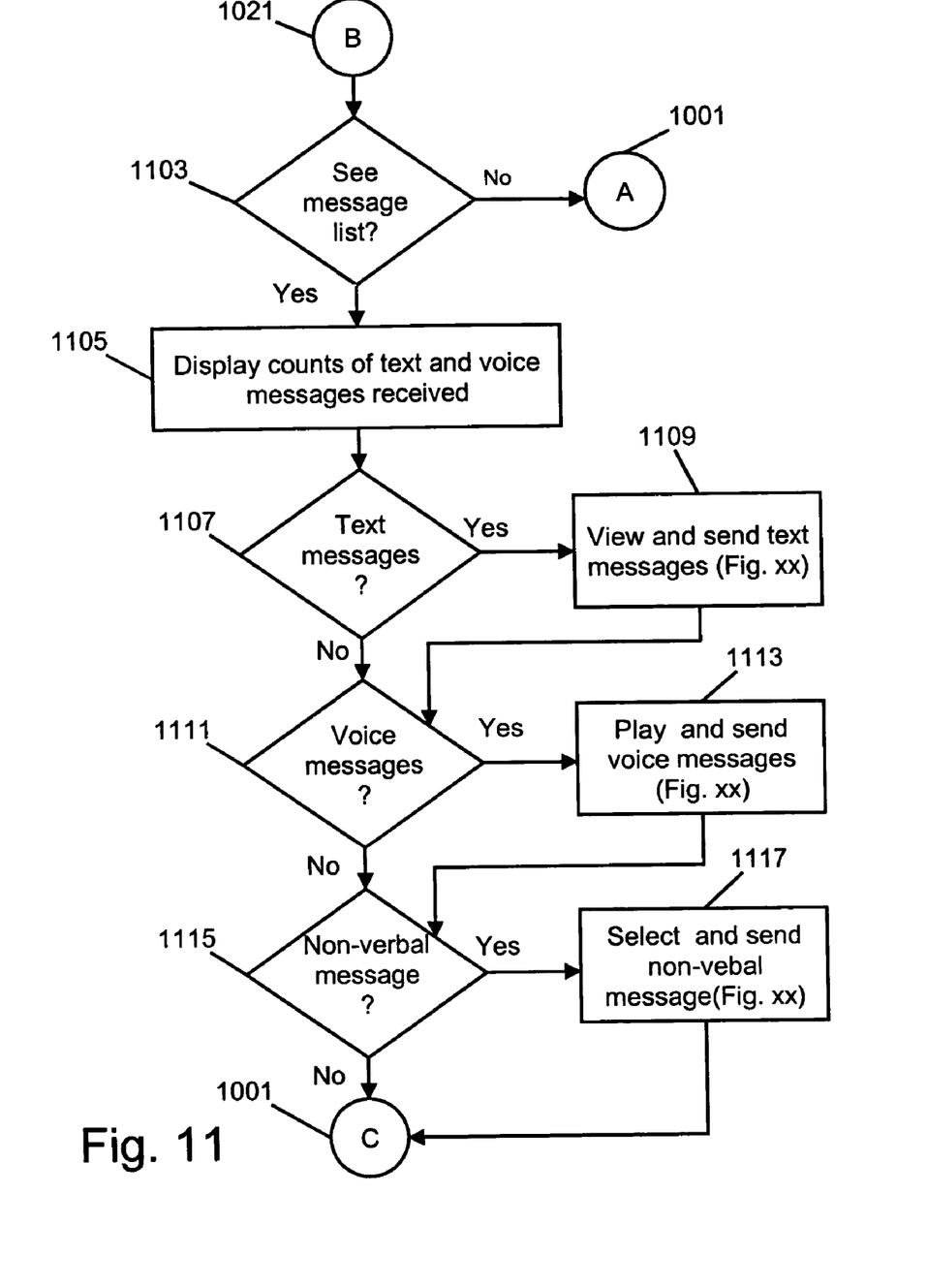

The functions performed by communicator units contemplated by the invention are depicted in the flowcharts, FIGS. 10-11. As seen in FIG. 10, the unit continually obtains and evaluates data from the sensor unit seen at 109 in FIG. 1. Location and movement data is abstracted by classifying the position data generated by the GPS device as seen at 1003. Physical activity data is produced by analyzing and classifying the data from one or more accelerometers as seen at 1005. The audio waveform from a microphone is analyzed and classified to determine whether of not the user is in a conversation as shown at 1007. In addition, as indicated at 1009, incoming data from other individuals who are members of the group is processed to display the icons, graphical symbols, message counts, photographs of these other individuals, and to generated audible, visible or vibratory alert signals based on that incoming data.

Unless one of the icons displayed on the default screen of FIG. 3 is selected, the steps indicated at 1003 through 1009 are repeated continually. If an icon is selected at 1011, the second level display screen (see FIG. 4) is displayed as indicated at 1013. If the user continues to view detailed information about a particular individual for more than a threshold duration as seen at 1015, a notification signal is to the other individual whose information is being viewed at 1017, causing the user's photograph to be displayed for a time on the remote user's screen as illustrated by FIG. 5.

If, while viewing the more detailed second level information about a selected individual, the user elects to engage in a message exchange with that selected individual, the user requests the menu screen of FIG. 6 at 1103. The menu screen of FIG. 6 displays the number of previously received and available text and voice instant messages, and allows the user the opportunity to make a selection at 1107 to view and send text messages using the screen seen in FIG. 7, to make a selection at 1111 to play back and send voice instant messages using the VIM control screen seen in FIG. 8, or to make a selection at 1115 to send non-verbal cues and alert signals using the "send a smile" control screen seen in FIG. 9.

When text or voice messages arrive from another individual, they until they can be read or listened to by the recipient. At the time the recipient chooses to read or listen to a received text or voice message, a "thinking of you" notification of the kind described above may be sent to the individual who transmitted the text or voice message, and the "thinking of you" notification can take the form, for example, of a picture as illustrated in FIG. 5 of the individual reading or listening to the text or voice message being sent to the individual who sent the message.

3.5 Location Learning

As illustrated in FIG. 4, the watch displays a remote insider's current location, or his next predicted one, using a symbol at 411, and displays the insider's expected time of arrival (ETA), or his last known location and the time elapsed since departure, by the arrow and numeral seen at 413. This involves three different components: the learning of recurrently visited locations, or endpoint detection; the identification of routes between these endpoints (sources and destinations); and inferring the currently traveled route and predicting ETA.

Endpoint Detection

The location coordinates (e.g. the coordinates listed in Tables 1 and 2 below) from an embedded GPS in the sensor unit 109 seen in FIG. 1 are collected throughout the day by the data collection and classification mechanism 111 the watch/phone and uploaded to a desktop computer 1120 via a short-range Bluetooth™ link, or via the cellular radio link provided by the unit 107. The GPS data are analyzed in the personal computer for personal landmarks, i.e. locations recurrently frequented, which are then presented to the user to be labeled as seen at 1203 in FIG. 12.

Figure 12:
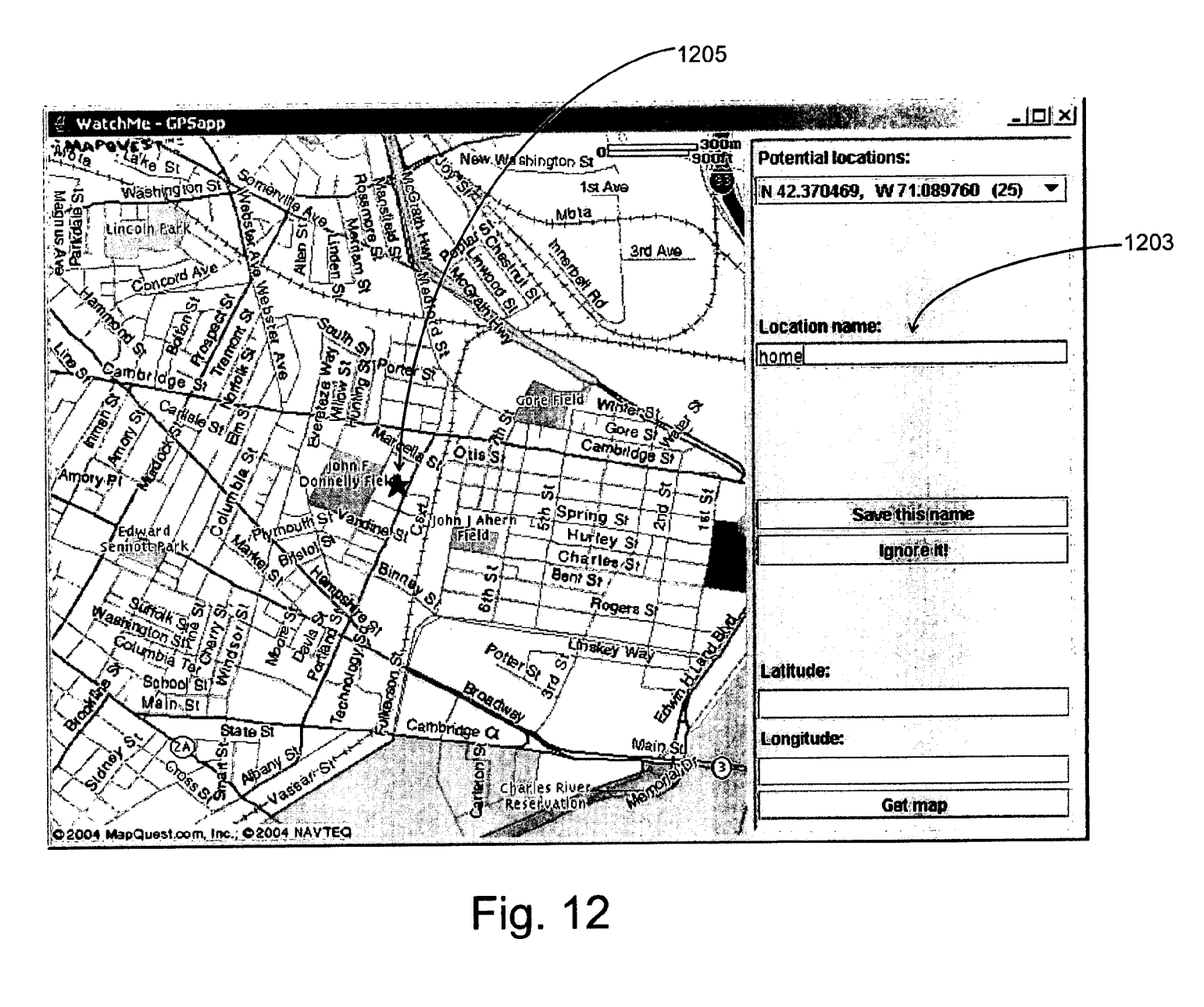
FIG. 12 illustrates a computer screen display used to identify frequented locations based on GPS data.

The graphical user interface display seen in FIG. 12 presented on the desktop computer 1120 shows the point on a map at 1205, and permits the user to name and save the location, or indicate that it is irrelevant and should be ignored. The location identification program that executes on the personal computer dynamically downloads the maps from an online map service, such as MapQuest™, that provides a map centered on the provided coordinates.

Locations which have been named by the user are considered endpoints of routes. Once a location has been marked as irrelevant, it, and any point within a given radius (default 40 m), will not be considered again. An irrelevant location is for example a bus stop, or train platform, where the user wearing the watch may remain stationary for a time.

The analysis program identifies locations where the watch has been repeatedly located as indicated by the GPS data. The user can define how many times he must be seen within a radius of a site in order for it to be considered as potential interesting and presented to the user to be named or designated as irrelevant.

The system can mark a location as potentially interesting for a number of reasons:

Static Fix

If the GPS data indicates that the watch was within a given radius for more than the user specified minimum duration (e.g. 10 minutes), the location should be considered.

In the prior ComMotion system, we had counted on the fact that GPS signal was lost in most buildings. With Assisted GPS (AGPS) this is often no longer true. A standalone GPS receiver acquires a position by searching for satellite signals and decoding their messages. This requires strong signals, line-of-sight to at least 3-4 satellites in an adequate constellation, and time to search for the different satellites and calculate a position. The AGPS units now typically used in mobile phones are assisted by the cellular network. Since the network already roughly knows the phone's location (from cell triangulation), it can assist the unit by pre-computing the doppler shift of the satellite signal, making it easier to find. Additionally, the base station can send the phone some of the coefficients needed for the positioning calculation. Consequently, signal loss does not provide a dependable indication of locations of potential interest, and "static fix" indications derived from the GPS data provide satisfactory results.

Although the GPS data analysis described above is performed on a personal computer, it could be performed using a processor on the watch, and the cellular phone link may be used to download maps suitable for use on the small display from an online map service.

Breaks in Time or Distance

The GPS tracking data analysis program may also search for breaks in time, or breaks in distance. The following example (Table 1) shows a break in time indicated in the GPS data when the user arrived home and did not get a GPS fix until leaving the following day.

TABLE 1

| Apr. 21, 2004, 2:10:45, | Lat: N 42.370416, | Lon: W 71.089723, |
| Apr. 21, 2004, 2:10:50, | Lat: N 42.370416, | Lon: W 71.089723, |
| Apr. 21, 2004, 2:13:54, | Lat: N 42.370363, | Lon: W 71.089701, |
| . | | |
| . | | |
| . | | |
| Apr. 22, 2004, 12:18:28, | Lat: N 42.370523, | Lon: W 71.089701, |
| Apr. 22, 2004, 12:18:32, | Lat: N 42.370568, | Lon: W 71.089701, |
| Apr. 22, 2004, 12:18:37, | Lat: N 42.370555, | Lon: W 71.089701, |

The location saved is always the one before the break in time, providing there was a "clean" GPS track up until that point. A track is considered no longer clean if the reported accuracy of the GPS fix is above a threshold, or if the distance between the consecutive points is incompatible with the speed the user is progressing at. In the case of a clean track, followed by a sequence of low accuracy readings, and then a break, the saved location is the fix before the sequence of bad readings. Although GPS data is much more reliable since Selective Availability (intentionally transmitted random errors) was turned off in March 2000, fluctuations still occur, especially in certain areas.

The following example (Table 2) shows a break in time and distance caused because the user entered a train station and exited in a different location. The location saved is the train station entered. The location after the break, i.e. the train station where the user exited, is not considered since, even with assisted GPS, the receiver often takes time to acquire a fix, and depending on the speed of travel, the user may be far from a potential personal landmark when the unit manages to lock on a position.

TABLE 2

| Apr. 20, 2004, 13:3:58, | Lat: N 42.362293, | Lon: W 71.085963, |
| Apr. 20, 2004, 13:4:1, | Lat: N 42.362328, | Lon: W 71.085963, |
| Apr. 20, 2004, 13:4:4, | Lat: N 42.362357, | Lon: W 71.085947, |
| Apr. 20, 2004, 13:7:8, | Lat: N 42.362400, | Lon: W 71.085920, |
| . | | |
| . | | |
| . | | |
| Apr. 20, 2004, 13:20:30, | Lat: N 42.374053, | Lon: W 71.118752, |
| Apr. 20, 2004, 13:20:34, | Lat: N 42.374008, | Lon: W 71.118731, |
| Apr. 20, 2004, 13:20:37, | Lat: N 42.374008, | Lon: W 71.118731, |

Low Accuracy

Several consecutive fixes (e.g. more than five) within a predetermined radius (e.g. 50 meters), with reported low accuracies is considered a potentially relevant location. Despite assisted GPS, in some buildings no fix is acquired, whereas in others the receiver obtains a position albeit with low reported accuracy. If a predetermined number of fixes within a given radius are identified which have low accuracy, they are considered to be the result of entering a building and identified as being potentially interesting.

Manually Saved

The user may press a button on the watch (indicated by a menu selection on the watch) to save the current location specified by the onboard GPS. This feature might be used to save locations not often frequented but considered important enough to mark, or alternatively to save locations which the system does not manage to pick out. For instance, an outdoor location often visited but only for a very short time would not be identified, since it could just as well be a long traffic light. A specific example is a user who frequently buys lunch from a food truck, and would like others to know when she is there, or on her way. The location is outside and the person is typically there for only a couple of minutes each time.

3.6 Route Identification and Prediction

Routes are defined as trajectories between named locations. The GPS track between the two endpoints is purged from fixes with low accuracy, and saved as an instance of the route. Positions with low accuracies are ignored under the assumption that they are random; if there is a pattern, and they are not simply noise, they will be identified over time and named or marked as irrelevant. A canonical route representative, or template, is calculated from the instances of a given route. The template is produced by dividing the route data into groupings comprising 100 meters of traveled distance and then forming the average latitude and longitude for each group of readings. The average elapsed time from the named source location to each 100 m segment and eventually to the named destination location, as well as the average speed, are also included in the template.

The individual instances are compared, before composing a route representative, to ensure that they are indeed different instances of the same route. An instance of a route that varies more than one standard deviation, from the average of all instances of that specific route, is automatically excluded from the template. Since a person could travel from point A to B on different routes, multiple templates corresponding to different trajectories between the same locations can be created. Routes A to B, and B to A, are considered to be two different routes.

Route Prediction

The canonical route representations are used to predict where the user is going and estimate the time of arrival. Initially the system will indicate how low ago the user left a known place, until it has enough information to predict the destination. The route the user is currently traveling is identified by trying to align it to all the templates. The alignment is a piecewise comparison of the route segments, generating a distance error for each segment, averaged into a total route error. The predicted route is the one with the smallest error, below a threshold (e.g. 100 m). The route templates provide a means to predict the traveled route, and based on the average time required to reach the current segment, predict an estimate time of arrival. If the user's travel time to the current segment is significantly different than that of the template, the ETA will be proportionally adjusted. For example, if a user normally bikes to a certain destination, however one day decides to walk, assuming the path traveled is similar, the ETA will be adjusted to reflect the slower pace.

If the full traveled route does not align well with any of the canonical routes, the system tries to align the last portion (e.g. the last 500 meters) of the trajectory. Since routes are defined as trajectories between named locations, if a user always passes point B on his way between A and C, when traveling in that direction he will always be predicted as heading to B although in some cases he might actually be going to C. Once he has passed location B, the prediction will be reassessed. Hence, the system is always predicting the current leg of the journey and the ETA to the next known location, even if this is an intermediary place on the way to a final destination.

All of the location learning and prediction is done on a computer located remotely from the watch, or on a processor in or carried with the watch. For example, using a Bluetooth connection between the watch and the processor on a PDA such as an iPaq carried by the wearer, the watch would send the location coordinates to the iPaq for analysis, and a real-time classification would be sent back to the watch. The classification outcome would be then be relayed over the cellular network to the wearer's insiders, and their watch graphical interfaces updated to reflect the new context. Alternatively, the GPS data from the watch, or template data reflecting averaged groupings of consecutive readings, could be transmitted to a remote computer via the cellular link which then performs location and route identification functions and makes the resulting information available to insiders in the network.

4 Privacy

In any awareness system some of the information that is revealed is sensitive to some of the participants at least part of the time. In the course of developing WatchMe we encountered and developed workable solutions for a number of privacy issues:

sensitive information: WatchMe reveals a lot of information about a user, but only the locations that the user has chosen to name; raw geographic coordinates are never revealed. A user might see that another is at the bookstore, but where the particular bookstore is physically located is not displayed. Additionally, WatchMe has been designed from the beginning to be a system used by people who are intimate friends. Since they already share much personal information, using technology to do so is less intrusive. People whom we are really close to know much more sensitive information about us than, for example, how long ago we left our house.

photographs: Photographs are very personal and a watch face is semi-public. People may be more sensitive in other cultures, but in ours we often display pictures of family, especially children, in offices and homes. We often carry them in wallets or purses, both to look at ourselves and to show to others. We now have them on phones as well, so displaying pictures of our loved ones on a watch is not that different. The detailed context information would not be readily understood by someone looking at our watch from a distance. It is also invoked only by specific user action.

reciprocity: WatchMe enforces reciprocity of data. A user cannot receive context data from another unless he is also sending his. There is also reciprocity of interaction: when user A views B's context data, A's photograph appears on B's watch. So a person can't "spy" on another without them knowing they are doing so, regardless of whether it carries a positive or negative connotation.

peer-to-peer vs. server: The current implementation depends on a server to relay the messages between the users. Now that there is better support of server sockets on the phones, the architecture could be modified to be peer-to-peer, over a secure socket, adding another layer of security. Even in this version, no data is stored on the server.

plausible deniability: The user has control over the locations he decides to share with his insiders, and at any given time he can manually make it seem that his watch is "out of service" (out of cellular range), or that he is in a conversation. We have thought about randomly invoking the "out of service" mode to provide the users with plausible deniability and prevent them from having to explain why suddenly they were disconnected. In this way it can be attributed to a supposed bug in the system, when in fact it is a privacy feature. The user's location is only transmitted to others when he is somewhere he has previously chosen to name, however the hardware that he is wearing is keeping a history of where he has been, to detect these patterns and perform calculations of ETA. In addition to giving the user the option of not sharing the location, he should also have the option of not logging it at all or the ability to delete certain sections from it. No acceleration data or audio is saved.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A method for gathering information describing the status of a first individual and delivering that information to a second individual comprising, in combination, the steps of:

employing a microphone positioned near said first individual to continuously and automatically collect acoustic data, analyzing said acoustic data to determine whether or not said acoustic data is produced by human speech to thereby determine whether or not said first individual is currently engaged in a conversation, generating status data derived at least in part from said acoustic data indicating whether or not said first individual is available to engage in communications with others, automatically transmitting said status data as it is collected from said first individual to said second individual, continuously presenting at least some of the status data received from said first individual to said second individual, and thereafter accepting a verbal text or voice message from said second individual and transmitting said verbal text or voice message to said first individual.

2. A method for gathering information describing the status of a first individual and delivering that information to a second individual as set forth in claim 1 further comprising the steps of generating additional status data indicating the current location of said first individual or the nature of the physical activity currently engaged in by said first individual, transmitting said additional status information to said second individual, accepting a request from said second individual and, in response to said request, presenting said additional status data previously transmitted by and received from said first individual but not previously presented to said second individual.

3. A method for gathering information describing the status of a first individual and delivering that information to a second individual as set forth in claim 2 further comprising the step, performed in response to said request from said second individual, of transmitting a notification message from said second individual to said first individual to indicate to said first individual that said second individual has requested said additional data describing the status of said first individual.

4. A method for gathering information describing the status of a first individual and delivering that information to a second individual as set forth in claim 3 further comprising the step of delivering one or more audible, visual or tactile alert signals to said first individual upon receipt of said notification message.

5. A method for gathering information describing the status of a first individual and delivering that information to a second individual as set forth in claim 4 wherein one of said alert signals is a visual identification of said second individual.

6. A method for gathering information describing the status of a first individual and delivering that information to second individual as set forth in claim 4 wherein one of said alert signals is a tactile stimulation applied to the body of said first individual.

7. A method for gathering information describing the status of a first individual and delivering that information to a second individual as set forth in claim 4 wherein one of said alert signals is a distinctive sound audible to said first individual.

8. A method for gathering information describing the status of a first individual and delivering that information to a second individual as set forth in claim 1 further comprising the steps of:
monitoring the movement of the body of said first individual to produce activity status data indicating the nature of the physical activity in which said first individual in currently engaged,
automatically transmitting said further status data from said first individual to said second individual, and
presenting an activity indication based on said activity status data to said second individual.

9. A method for gathering information describing the status of a first individual and delivering that information to a second individual as set forth in claim 1 further comprising the steps of:
employing a geographical position sensor for generating position data indicating the current position of said first individual, and
deriving an indication of the current or predicted location of said first individual from said position data and presenting said indication to said second individual.

10. A method for gathering information describing the status of a first individual and delivering that information to a second individual as set forth in claim 9 wherein said indication of the current or predicted location of said first individual specifies a location name previously supplied by said first individual.

11. A method for gathering information describing the status of a first individual and delivering that information to a second individual as set forth in claim 9 wherein said step of deriving an indication of the current or predicted location of said first individual from said position data includes the step of comparing said position data with data specifying one or more established routes between known locations.

12. A method for gathering information describing the status of a first individual and delivering that information to a second individual as set forth in claim 9 wherein said indication of the current or predicted location of said first individual indicates a past location of said first individual and the time duration that has elapsed since said first individual left said past location.

13. A method for gathering information describing the status of a first individual and delivering that information to a second individual as set forth in claim 9 wherein said indication of the current or predicted location of said first individual indicates a destination location of said first individual and the amount of time predicted to elapse before said first individual is expected to arrive at said destination location.

14. A method for gathering information describing the status of a first individual and delivering that information to a second individual as set forth in claim 9 wherein said indication of the current or predicted location of said first individual indicates locations frequented by said first individual.

15. A method for gathering information describing the status of a first individual and delivering that information to a second individual as set forth in claim 14 wherein said locations frequented by said first individual are specified by names supplied by said first individual.

16. A method for gathering information describing a first individual and delivering that information to a second individual as set forth in claim 1 wherein said microphone converts sound pressure waves in the vicinity of said given one of said members into said acoustic data.

17. A method for gathering information describing the status of a first individual and delivering that information to a second individual as set forth in claim 2 wherein said request is produced by said second individual selecting said first individual from a group of individuals from whom status data has been received.

18. A method for gathering information describing the status of a first individual and delivering that information to a second individual as set forth in claim 2 wherein said request is produced by said second individual requesting the presentation of additional information previously received from said first person.

19. A method for notifying a first person when a second person has requested information produced by or concerning said first person comprising, in combination, the steps of:
storing said information in a form and at a location accessible to said second person,
accepting a request from said second person for the presentation of at least some of said information,
measuring the time duration that elapses while said information is being presented to said second person in response to said request,
transmitting a notification signal to said first person identifying said second person when said time duration exceeds a threshold duration, and
immediately upon receipt of said notification signal, presenting the identification of said second person to said first person whereby said first person is made aware of that said second person has shown an interest in said first person.

20. A method for notifying as set forth in claim 19 wherein said notification signal includes one or more audible, visual or tactile alert signals presented to said first person upon receipt of said notification message.

21. A method for notifying as set forth in claim 19 wherein said notification signal includes a visual identification of said second individual presented to said first person upon receipt of said notification signal.

22. A method for notifying as set forth in claim 19 wherein said notification signal includes a tactile stimulation applied to the body of said first individual upon receipt of said notification signal.

23. A method for notifying as set forth in claim 19 wherein said notification signal includes a distinctive sound audible to said first individual produced upon receipt of said notification signal.

24. A context aware personal communications device for enhancing communication between a first person and a second person comprising, in combination,
one or more sensors for continuously and automatically producing raw data indicative of the location and movement of said first person,
a processor for classifying said raw data into one or more derived status indicator values selected from a limited set of predefined status indicator values, at least one of said status indicator values being indicative of the kind of physical activity in which said first person is currently engaged,
a data communications link accessible to said first person and to said second person for continuously and automatically transmitting data signals including said derived status indicator values from said first person to said second person,
a display device for visually and continuously displaying to said second person one or more of said derived status indicator values received from said first person via said data communications link, and means responsive to a request from said second person for thereafter performing a bidirectional verbal text or voice message exchange between said first person and said second person.

25. A context aware personal communications device as set forth in claim 24 wherein at least a portion of said personal communications device is worn on the body of said first person.

26. A context aware personal communications device as set forth in claim 25 wherein said portion of said personal communications device worn on the body is worn on the wrist and includes said user input device and said display device.

27. A context aware personal communications device as set forth in claim 24 wherein said one or more sensors includes a geographical position sensor for generating data indicating the current position of said given one of said members and wherein said derived status indicator values includes at least one location indicator value.

28. A context aware personal communications device as set forth in claim 24 wherein said limited set of predefined indicator values includes values that indicate a corresponding set of predefined activities in which said given one of said members may be currently engaged, said set of predefined activities including walking, running and moving in a vehicle.

29. A context aware personal communications device as set forth in claim 24 further comprising a transducer for converting sound pressure waves in the vicinity of said given one of said members into an audio data signal and wherein said limited set of predefined indicator values includes values derived from said audio data signal indicating whether or not said given person is currently engaged in a conversation.

30. A context aware personal communications device as set forth in claim 24 wherein said one or more sensors includes:
a geographical position sensor for generating data indicating the current position of said given one of said members and wherein said limited set of predefined indicator values includes location indicator values,
a sensor for generating data indicating the movement of the body of said given one of said members and wherein said limited set of indicator values further includes values that indicate the nature of the activity of said given one of said members, and
a transducer for converting sound pressure waves in the vicinity of said given one of said members into an audio data signal and wherein said limited set of indicator values further includes values indicating whether or not said given person is currently engaged in a conversation.

31. A context aware personal communications device as set forth in claim 24 wherein said bidirectional verbal text or voice message exchange comprises the transmission, reception and playback of recorded voice messages exchanged between said first person and said second person.

32. A context aware personal communications device as set forth in claim 24 wherein said bidirectional verbal text or voice message exchange comprises the transmission and reception of a verbal text messages composed by and exchanged between said first person and said second person.

33. A context aware personal communications device as set forth in claim 24 wherein said message exchange is performed by establishing a bi-directional voice communication channel between said first person and said second person.

34. A context aware personal communications device as set forth in claim 33 wherein said data communications link and said bi-directional voice communication channel are both provided by a cellular communication network coupling cellular communications devices carried by both said first person and said second person.

35. A method for exchanging information between members of a limited group of consenting individuals comprising, in combination, the steps, performed for each given one of said members, of:
employing one or more sensors to continuously obtain raw data indicative of the nature of the physical activity currently engaged in by a given one of said members,
classifying said raw data into one or more current status values selected from a limited set of predefined status values,
continuously transmitting said current status values from said given one of said members to each of the other members of said group,
visually and continuously displaying to said given one of said members an indication of the current availability of each of the other members of said group to actively participate in communications, said indication being derived from at least one of the current status values received from each of said other members of said group, and thereafter,
in response to a request accepted from said given one of said members identifying a particular one of said other members of said group, transmitting a verbal text or voice message to said particular one of said other members.

36. A method for exchanging information as set forth in claim 35 wherein said one or more sensors includes a geographical position sensor for generating data indicating the current position of said given one of said members and wherein said limited set of predefined status values includes location indicator values.

37. A method for exchanging information as set forth in claim 36 wherein at least some of said location indicator values are produced by accepting from said given one of said members a new location indicator value when data generated by said geographical position sensor indicates that said position sensor is located at a previously unidentified and previously frequented location.

38. A method for exchanging information as set forth in claim 37 wherein said one or more sensors includes a geographical position sensor for generating data indicating the current position of said given one of said members and wherein said limited set of predefined status values includes values characterizing the movement of said given one of said members along a route between predetermined locations derived by comparing said data indicating the current position of said given one of said members with data specifying one or more established routes between said predetermined locations.

39. A method for exchanging information as set forth in claim 35 wherein said one or more sensors includes a sensor for generating data indicating the movement of the body of said given one of said members and wherein said limited set of predefined status values includes values that indicate a particular one of a set of predefined activities in which said given one of said members may engage, said set of predetermined activities including walking, running and moving in a vehicle.

40. A method for exchanging information as set forth in claim 35 wherein said one or more sensors includes a transducer for converting sound pressure waves in the vicinity of said given one of said members into an audio data signal and wherein said predetermined set of indicator values includes values indicating whether or not said given person is currently engaged in a conversation.

41. A method for exchanging information as set forth in claim 35 wherein said one or more sensors includes a transducer for converting sound pressure waves in the vicinity of said given one of said members into an audio data signal and wherein said predetermined set of indicator values further includes values indicating whether or not said given person is currently engaged in a conversation.

42. A method for exchanging information as set forth in claim 35 wherein said indication of the current availability of each of the other members of said group to actively participate in communications further indicates whether or not each of said other members of said group has access to an operative communication link that can be used for said communications.

43. A method for exchanging information as set forth in claim 35 wherein said step of visually and continuously displaying comprises visually displaying predetermined graphical symbols representing status values received from other members of said group.

44. A method for exchanging information as set forth in claim 35 wherein said step of transmitting said status values is performed by transmitting data values via a communication network linking communication devices carried by said members of said limited group of consenting individuals, said communications devices being capable of exchanging both verbal text and voice messages in both directions between any two of said members.

45. A method for exchanging information as set forth in claim 44 wherein said communications network includes a cellular telephone network.

46. A method for exchanging information as set forth in claim 44 wherein said message exchange comprises the transmission or reception of a message.

47. A method for exchanging information as set forth in claim 44 wherein said message exchange comprises the transmission or reception and recording of a voice message.

48. A method for exchanging information as set forth in claim 44 wherein said message exchange comprises establishing a bi-directional voice communications channel between any two of said members.

49. A method for exchanging information as set forth in claim 44 wherein said step of performing a message exchange comprises the transmission of reception of one or more non-verbal signals selected from a group comprising: a picture or a graphical symbol identifying one of said members, a sound, a displayed light or color, and a tactile vibration.

50. A method for exchanging information as set forth in claim 44 wherein said message exchange comprises message exchange mode selected by one of said members from the group comprising:
- the transmission or reception and recording of a voice message,
- the transmission or reception of a text message,
- the transmission or reception of non-verbal signals, and
- establishing a bi-directional voice communications channel between said given one and said selected one of said member.

* * * * *